United States Patent [19]
Kouyama et al.

[11] Patent Number: 4,863,669
[45] Date of Patent: Sep. 5, 1989

[54] PROCESS FOR FORMING POLYARYLENETHIOETHER STRETCHED BLOW-MOLDED VESSEL

[75] Inventors: Toshitaka Kouyama; Takayuki Katto; Takao Iwasaki; Yo Iizuka; Zenya Shiiki, all of Iwaki, Japan

[73] Assignee: Kureha Kagaku Kogyo Kabushiki Kaisha, Tokyo, Japan

[21] Appl. No.: 233,832

[22] Filed: Aug. 18, 1988

Related U.S. Application Data

[62] Division of Ser. No. 859,800, May 5, 1986, abandoned.

[30] Foreign Application Priority Data

May 8, 1985 [JP] Japan ................... 60-97512

[51] Int. Cl.$^4$ ............................................. B29C 49/12
[52] U.S. Cl. ................................... 264/532; 264/537; 264/235; 264/346
[58] Field of Search ............... 264/532, 537, 538, 235, 264/346; 528/388; 525/537; 428/35

[56] References Cited

U.S. PATENT DOCUMENTS

| | | | |
|---|---|---|---|
| 4,362,864 | 12/1982 | Idel et al. | 528/388 |
| 4,524,045 | 6/1985 | Hayashi et al. | 264/532 |
| 4,579,784 | 4/1986 | Lemstra et al. | 264/291 |

FOREIGN PATENT DOCUMENTS 59-217727 12/1984 Japan.

Primary Examiner—Jan H. Silbaugh
Assistant Examiner—Neil Michael McCarthy
Attorney, Agent, or Firm—Wenderoth, Lind & Ponack

[57] ABSTRACT

A process for forming a polyarylenethioether stretched blow molded vessel, by a modified blow molding of a substantially linear polyarylenethioether having a melt viscosity of 3,000 to 20,000 poise [at 310° C., shear rate=200 sec$^{-1}$]. The modified blow molding involves injecting the polymer in a mold to form a bottomed parison, stretching the bottomed parison along its axis by means of a rod or mandrel, and the stretched bottomed parison is then subjected to blow molding to effect lateral stretching. The blow parison is then heat set.

4 Claims, 1 Drawing Sheet

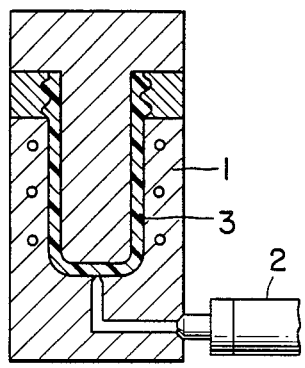
FIG. I(a)
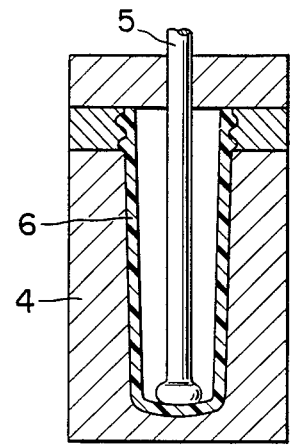
FIG. I(b)
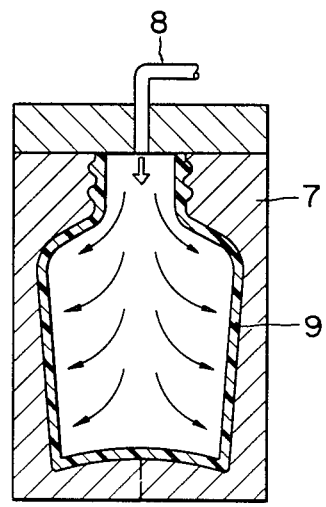
FIG. I(c)

PROCESS FOR FORMING POLYARYLENETHIOETHER STRETCHED BLOW-MOLDED VESSEL

This application is a division of Ser. No. 859,800, filed May 5, 1986, now abandoned.

BACKGROUND OF THE INVENTION

1. Field of the Art

This invention relates to a stretched blow molded vessel or stretched heat set blow molded vessel made from a linear polyarylenethioether having a melt viscosity of 3,000 to 20,000 poise, and also to a process for producing these stretched blow molded vessels.

2. Prior Art

Polyarylenethioethers, for example, poly-p-phenylenethioethers, have heat resistance which can stand the heat of steam sterilization and chemical resistance to strong acids, strong alkalis or various organic solvents, and therefore they have been expected to be useful as a material for vessels (bottles, tanks, flasks, etc.) for uses in medicine, foods and other various chemicals, if they can be molded into a shape of bottles. However, from the viewpoint of a molding material, polyarylenethioethers available in the prior art involve problems such that they are poor in linearity of the molecular structure, and therefore they can be formed into vessels with difficulty or, if forcibly made into shapes of bottles, they are too brittle to stand practical use.

On the other hand, from the viewpoint of processing techniques, there have been the problems such that (i) polyarylenethioethers have so great a crystallization rate that they can be molded into stretched bottles with extreme difficulty, or that (ii) according to the conventional extrusion blow molding, namely the process in which a parison is extruded and subjected to blow molding, drawdown of the parison takes place to a great degree and therefore molding into a vessel with a wall of a uniform cross section can be done with extreme difficulty.

For this reason, except for a multi-layer hollow vessel obtained by extrusion blow molding together with a crystalline polyolefin (Japanese Laid-Open Patent Publication No. 79233/1980), polyarylenethioethers have not generally been used alone as the resin for hollow vessels.

SUMMARY OF THE INVENTION

The present inventors have studied intensively in order to solve these problems and consequently found that a stretched blow molded vessel of a polyarylenethioether can be obtained by use of a polyarylenethioether of a linear structure having a melt viscosity of 3,000 to 20,000 poise as the starting material and carrying out injection and stretching blowing under appropriate conditions.

More specifically, the polyarylenethioether stretched blow-molded vessel according to the present invention is characterized in that it is obtained by a method comprising injection and stretching blow molding of a substantially linear polyarylenethioether having a melt viscosity of 3,000 to 20,000 poise measured at 310° C. and a shear rate of 200 $s^{-1}$.

The process for producing the polyarylenethioether stretched blow-molded vessel comprises injecting a substantially linear polyarylenethioether having a melt viscosity of 3,000 to 20,000 poise measured at 310° C. and a shear rate of 200 $s^{-1}$ into a mold of 0° to 130° C. to form a bottomed parison with an opening at an opposite end, pushing a mandrel or rod into said bottomed parison through the opening thereof to stretch the parison at a resin temperature of 80° to 150° C. in the longitudinal direction to 1.5 to 6-fold and subsequently blowing a gas into the parison at a resin temperature of 90° to 180° C. within a mold for formation of a vessel to stretch the parison in the lateral direction to 1.5 to 6-fold.

In the present invention, by use as a molding resin of a polyarylenethioether which has a certain greatness of molecular weight (3,000 to 20,000 poise in terms of melt viscosity) and is susbstantially linear, physical properties and processability as a hollow vessel can be satisfied and, by employment of a process, in which a bottomed parison is previously molded by injection molding, and the parison is thereafter stretched first in the longitudinal direction with a rod and then in the lateral direction by blowing of a gas, a stretched hollow vessel can be produced with ease without suffering from the drawdown of the parison.

The hollow vessel thus obtained is transparent and tough, and also excellent in heat resistance and chemical resistance.

BRIEF DESCRIPTION OF THE DRAWINGS

In the accompanying drawings:

FIGS. 1(a), (b) and (c) are a sectional view showing the molds used in the production of a stretched blow-molded vessel in accordance with the present invention, wherein FIG. 1(a) shows injection molding for producing a bottom parison, FIG. 1(b) stretching the bottomed parison, and FIG. 1(c) blow-molding of the stretched parison.

DETAILED DESCRIPTION OF THE INVENTION

Molding Material

The blow-molded vessel according to the present invention is characterized by the use of a polymer having a structure of a polyarylenethioether (—Ar—S—)$_n$ (AR: arylene group). The polyarylenethioether polymer may preferably comprise a p-phenylene group as the arylene group of a p-phenylene group as the main component of the arylene group in view of heat resistance and moldability of the polymer. Arylene groups other than a p-phenylene group may include:

m-phenylene group

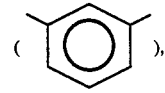

alkyl-substituted phenylene group

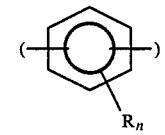

(R: alkyl group, preferably a lower alkyl; n: an integer of 1 to 4), p,p'-di-phenylenesulfone group

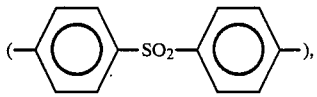

p,p'-biphenylene group

p,p'-diphenyleneether group

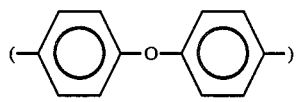

naphthalene group

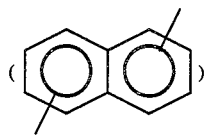

as useful ones.

Also, a block copolymer containing a p-phenylene group as the main component, for example, a block copolymer containing 95 to 70 mol% of the recurring units of

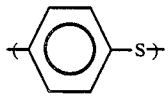

in a block and 5 to 30 mol % of m-phenylene groups in a block in the chain (as disclosed in Japanese Patent Application No. 134633/1984), corresponding to U.S. application Ser. No. 748,464, filed June 25, 1985 and refiled as a continuation application Ser. No. 858,851 (filed Apr. 30, 1986) is more excellent in stretched blow moldability than poly-p-phenylenesulfide homopolymers (PPPS) and yet has mechanical properties, etc. substantially comparable to PPPS, thus being more excellent than PPPS, and therefore is particularly preferable.

The base resin to be used for the stretched blow molded vessel of the present invention has the above chemical structure, and is also a substantially linear polyarylenethioether having a melt viscosity of 3,000 to 20,000 poise (measured at 310° C., shear rate=200 sec$^{-1}$), particularly preferably is 4,000 to 15,000 poise. With a polymer having a low melt viscosity less than 3,000 poise, the thickness of a wall of the vessel may be nonuniform and breaking may occur at the thin portion, whereby stretched blowing can be done with difficulty, or even if stretched blow molding may be possible, the resultant product is undesirably mechanically fragile. On the other hand, in the case of a polymer having a high melt viscosity in excess of 20,000 poise, the melt resin can be filled to the tip portion with difficulty during molding of a bottomed parison by injection, whereby the thickness tends to become also undesirably nonuniform.

Further, the polyarylenethioether to be used in the present invention is required to be substantially linear. For example, a crosslinked polymer obtained by crosslinking polymerization with the use of as much as 0.1 mole or more of a crosslinking agent such as tri- or tetrachlorobenzene per 100 mols of arylene groups during polymerization, or a polymer crosslinked by high temperature treatment of the polymer in the presence of $O_2$ thereby having an apparent melt viscosity increased to two-fold or more is not preferable for the present invention. These crosslinked polymers are not preferable for the reason that stretched blow moldability is very poor during stretching blowing, or because of insufficient mechanical strength of the molded vessel, even if stretching blowing can be effected. Besides, the polymers crosslinked by high temperature treatment having viscosity increased are excessively colored whereby stretched blow molded products of poor transparency will be produced.

The linear polyarylenethioether satisfying the conditions of the resin of the present invention as described above can be prepared according to, for example, the two-step polymerization process wherein some quantity of water is added thereto, etc. by the present inventors in the pending patent application filed (Japanese Patent Application No. 126725/1984, corresponding to U.S. application Ser. No. 746,252, filed June 18, 1985, now U.S. Pat. No. 4,645,826).

The polyarylenethioether as described above can be preferably used as such, but within the limit wherein no trouble is brought about in stretched blow molding, it is also possible to add inorganic fillers (silica powder, alumina powder, silica-alumina powder, mica, kaolin, calcium carbonate powder, calcium silicate powder, talc, carbon black, wollastonite, potassium titanate whisker, etc.), fibrous fillers (glass fiber, carbon fiber, etc.), crystalline nucleating agents, crystallization controllers, pigments, stabilizers, lubricants, mold release agents, etc. also, so long as no trouble is caused in stretching blow molding, it is possible to use polyarylenethioethers with different chemical structures or other thermoplastic resins blended in the resin of the present invention.

INJECTION AND STRETCHING (AND HEAT SET) BLOW MOLDING

Blow molding generally comprises extruding a thermoplastic resin as a parison through an extruder, then inserting said parison into an open mold (comprising a pair of mating mold halves), closing both the mold halves to seal the ends of the parison, and at the same time blowing a high pressure gas through the opening portion to inflate the parison, thereby obtaining a vessel with a contour which is the same as the inner surface shape of the mold. However, the polyarylenethioether as the molding material has great fluidity during melting and yet small viscoelastic property, whereby the drawdown is great and molding according to the process of "parison extrusion" and then "blow molding" can be done with difficulty.

The present invention, in skilfull utilization of the very fluidity, which is high, of a polyarylenethioether, purports to melt the resin by heating to its melting point or higher and form a bottomed parison according to the injecting molding method. During this molding, the injection mold temperature is maintained at 0° to 130° C., preferably 20° to 110° C. At a temperature lower than 0° C., it will take too long a time before heating to the stretching and blowing temperature in the stretching blow step, which is not desirable from the standpoint of productivity. On the other hand, at a temperature exceeding 130° C., the bottom parison tends to crystallize, whereby stretching can be effected insufficiently in the stretching step.

After molding of the bottomed parison, the longitudinal stretching step is performed. The bottomed parison obtained is fixed at the opening portion, and a mandrel or rod is pushed into the parison from the opening portion to effect stretching in the longitudinal (axial) direction. The stretching ratio should preferably be within the range from 1.5 to 6-fold, particularly from 2 to 5-fold the original length. At a stretching ratio below 1.5-fold molecular orientation is insufficient and therefore through vessels can be obtained with difficulty. On the other hand, at a stretching ratio in excess of 6-fold, the bottom of the parison may be undesirably broken.

The resin temperature of the parison during stretching should preferably be within the range from 80° to 150° C. and, for that purpose, the parison can be pre-heated or the rod may be heated. At a temperature lower than 80° C., stretching can be done with difficulty, while at a temperature exceeding 150° C., tough vessels can be obtained with difficulty, because only insufficient molecular orientation can be obtained even when stretched.

The next step following the longitudinal stretching is the lateral stretching step, namely the blowing step. The longitudinally stretched tube is placed between mating halves of a mold for formation of a vessel, and a high pressure gas is blown thereinto, thereby effecting lateral stretching until the resin is pushed against the inner walls of said mold. The stretching ratio should desirably be within the range from 1.5 to 6-fold, particularly from 2 to 5-fold the original length of the tube wall. At a stretching ratio lower than 1.5-fold, molecular orientation is insufficient, whereby tough and highly transparent vessels can be obtained with difficulty. On the other hand, at a ratio exceeding 6-fold, the parison may be broken during blowing.

The resin temperature during blowing should preferably be within the range from 90° to 180° C. and, for that purpose, the tube can be pre-heated or the blowing gas can be heated up to 180° C. At a resin temperature lower than 90° C., stretching can be done with difficulty, while at a temperature exceeding 180° C., tough and highly transparent vessels can be obtained with difficulty because molecular orientation is insufficient even if stretched.

The blow-molded vessel thus subjected to longitudinal and lateral stretching is a transparent and tough vessel, and also excellent in heat resistance and chemical resistance. However, in the case when heat resistance is further demanded, it is preferable to heat set in the stretched state. That is, heat setting is effected by maintaining the vessel stretched longitudinally and laterally at a temperature of 150° to 260° C. for 1 second to 60 minutes. At a temperature lower than 150° C., it will take a long time for heat setting so as to be disadvantageous with respect to productivity, while the resin may be undesirably melted at a temperature over 260° C. With a time shorter than 1 second, no satisfactory heat setting can be obtained, while a time over 60 minutes is disadvantageous in productivity. Heating may be conducted according to any desired method, but it is preferable to blow a high temperature gas from the opening portion of the molded vessel. Also, in the case of effecting heat setting within this mold, the mold may be heated, simultaneously with the blowing of a high temperature gas into the vessel in the mold.

After heat setting, the vessel produced is cooled to a temperature of 150° C. or lower. Cooling may be done according to any desired method, but it is preferable to perform cooling by blowing a cooling gas lower than 150° C. from the opening portion of said vessel.

Having described above about the basic or typical embodiment of the present invention, it would be apparent to those skilled in the art that various modifications other than this embodiment are possible. Accordingly, for example, the longitudinal stretching step can be performed within the mold for formation of a vessel, and lateral stretching can be done after a simultaneously with longitudinal stretching. Also, it is preferable with respect to productivity to practice lateral stretching and heat setting within the same mold. The mold or mandrel rod to be used for injection molding, longitudinal stretching, lateral stretching and heating setting may be applied with a mold release agent such as of a silicone or a fluorinated product for easy releasing of the molded product from the mold. Further, mold release can be done with ease, if a small amount of a mold release agent is mixed into the resin.

FIGS. 1(a) through (c) illustrate the procedure.

In FIG. 1(a), a molten mass of a resin is injected into a mold 1 by means of an injection machine 2 whereby a bottomed parison 3 is formed.

In FIG. 1(b), the bottomed parison is placed in a mold 4 and stretched along its axis by means of a mandrel or bar 5 whereby a stretched bottomed parison 6 is formed.

In FIG. 1(c), the stretched bottom parison is placed in mating mold havles 7 and a gas 8 is introduced into the parison to inflate the parison to assume the shape defined by the inner surface of the mold halves whereby a stretched blow-molded vessel 9 is produced.

VESSEL PRODUCED

The stretched blow-molded product of the polyarylenethioether of the present invention (bottle, tank, flask, etc.) is excellent in heat resistance, toughness and chemical resistance. Also, it has a great specific feature that it can be formed into a transparent article. The blow-molded product of the present invention, which can be boiled or steam sterilized and is also transparent, would be useful for medical and food purposes. Further, since the product of the present invention is excellent in heat resistance and chemical resistance, it is useful for vessels to be used at higher temperatures and vessels for containing strong acids, strong alkalis or organic solvents.

EXPERIMENTAL EXAMPLES

Synthesis examples (1) A 20-liter titanium-lined polymerization autoclave was charged with 11.0 kg of NMP (N-methylpyrrolidone) and 20.0 mols of $Na_2S.5H_2O$, and the mixture was heated up to about 200° C. to distill off water (the sulfur content lost during the distillation discharged as $H_2S$ was 1.4 mol% of the $Na_2S.5H_2O$ charged; the residual water content in the autoclave: 28 mols). Next, 20 mols of P-DCB (p-dichlorobenzene) and 3 kg of NMP were charged and, after replacement of the inside of the autoclave with N₂, polymerization was carried out at 220° C. for 3 hours, and further the reaction was continued with addition of 54 mols of water at 255° C. for 0.5 hour to prepare a reaction mixture (C-1), which was withdrawn from the autoclave and stored. A small amount of the (C-1) mixture was sampled and the polymerization degree of the p-phenylenesulfide polymer was measured (by the fluorescent X-ray method) to be 270. The polymer produced stood as a prepolymer for the further polymerization.

A 20-liter titanium-lined polymerization autoclave was charged with 11.0 kg of NMP and 20.0 mols of Na₂S.5H₂O, and the mixture was heated up to about 200° C. to distill off water (S content loss=1.4 mol% of the Na₂S.5H₂O charged; the residual water content in the autoclave: 27 mols). Then, 20 mols of m-DCB (metadichlorobenzene) and 3 kg of NMP were charged and, after replacement of the atmosphere with N₂, polymerization was carried out at 210° C. for 12 hours, and further the reaction was continued with addition of 52 mols of water at 250° C. for 0.5 hours to prepare a reaction mixture (D-1), which was withdrawn from the autoclave and stored. A small amount of the (D-1) mixture was sampled and the polymerization degree of the m-phenylenesulfide polymer was measured (by the GPD method) to be 90. The polymer produced stood as a prepolymer for the further polymerization.

A 20-liter titanium-lined polymerization autoclave was charged with 14350 g of the (C-1) mixture, 2400 g of the (D-1) mixture and 130 g of water, and the mixture was heated at 260° C. for 4 hours to react the two types of the prepolymers into a block copolymer. After the reaction, the block copolymer thus produced was recovered from the reaction mixture. Additional five batches of polymerization were further carried out according to the same method, and six batches of the polymer were blended uniformly to prepare a block polymer (T-1).

The block polymer T1 was found by the FT-IR method to have a compoisition of

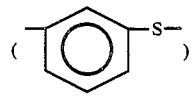

units

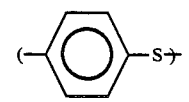

units of 14/86 (mol/mol), with melt viscosity being 5,100 poise (at 310° C., shear rate=200 s⁻¹).

(2) A 20-liter titanium-lined polymerization autoclave was charged with 11.0 kg of NMR and 20.0 mols of Na₂S.5H₂O, and the mixture was heated up to about 200° C. to distill off water (S content loss discharged as H₂S was 1.3 mol% of the Na₂S.5H₂O charged; the residual water content in the autoclave: 25 mols). Next, 20 mols of P-DCB and 3 kg of NMP were charged and, after replacement of the inside of the autoclave with N₂, polymerization was carried out at 210° C. for 5 hours, and further the reaction was continued with addition of 52 mols of water at 250° C. for 0.5 hours to prepare a reaction mixture (C-2), which was withdrawn from the autoclave and stored. A small amount of the (C-2) mixture was sampled and the polymerization degree of the p-phenylenesulfide polymer, a prepolymer, was measured (by the fluorescent X-ray method) to be 220.

A 20-liter titanium-lined polymerization autoclave was charged with 11.0 kg of NMP and 20.0 mols of Na₂S.5H₂O, and the mixture was heated up to about 200° C. to distill off water (S content loss=1.6 mol% of the Na₂S.5H₂O charged; the residual water content in the autoclave: 28 mols). Then, 20 mols of m-DCB and 3 kg of NMP were charged and, after replacement of the inside of the autoclave with N₂, polymerization was carried out at 210° C. for 7 hours, and further the reaction was continued with addition of 53 mols of water at 240° C. for 0.5 hours to prepare a reaction mixture (D-2), which was withdrawn from the autoclave and stored. A small amount of the (D-2) mixture was sampled and the polymerization degree of the m-phenylenesulfide polymer, a prepolymer, was measured (by the GPC method) to be 40.

A 20-liter titanium-lined polymerization autoclave was charged with 14400 g of the (C-2) mixture, 2420 g of the (D-2) mixture and 110 g of water, and the mixture was heated at 255° C. for 4 hours to react the two types of the prepolymers into a block copolymer. After the reaction, the block polymer produced was recovered from the reaction mixture. Additional one batch of polymerization was further carried out according to the same procedure, and two batches of the polymer were blended uniformly to prepared a block polymer (T-2).

The block polymer T-2 was found by the FT-IR method to have a composition of

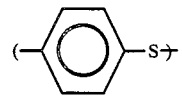

units

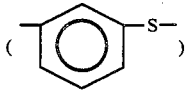

units of 88/12 (mol/mol), with melt viscosity being 3,500 poise.

(3) A 20-liter titanium-lined autoclave was charged with 11.0 kg of NMP, 20.0 mols of Na₂S.5H₂O, and the mixture was heated under N₂ atmosphere over about 1.5 hours up to 200° C. to distill off water, 1.55 kg of NMP and 0.45 mols of H₂S (residual water content in the autoclave: 29.4 mols). The mixture was cooled to 130° C., 19.5 mols of P-DCB and 3.0 kg of NMP were added, and polymerization was carried out at 210° C. for 6 hours. Then, 70.6 mols of water were additionally charged into the polymerization system to increase the water content in the system, and polymerization was further carried out at 270° C. for 10 hours. After polymerization, the polymer was separated by filtration from the reaction mixture, neutralized with dil. hydrochloric acid, washed with water and dried to obtain a poly-p-phenylenethioether (PPPS) T-3. The PPPS T-3 was found to have a melt viscosity of 12,500 poise.

(4) A 20-liter stainless steel autoclave was charged with 11.0 kg of NMP and 20.0 mols of Na₂S.5H₂O, and the mixture was heated under N₂ atmosphere over about one hour up to 200° C. to distill off water, 1.50 kg of NMP and 0.44 mols of H₂S (residual water content in the autoclave: 29.9 mols). The mixture was cooled to 130° C., 19.5 mols of P-DCB and 3.1 kg of NMP were added, and polymerization was carried out at 215° C. for 10 hours.

The polymer was separtd by filtration from the polymerized slurry, neutralized with hydrochloric acid, washed with water and dried to obtain a poly-p-phenylenethioether. Additional two batches of polymerization were further carried out according to the same procedure, and the polymers obtained (3 batches) were uniformly blended to obtain a poly-p-phenylenethioether (PPPS) T-4. The PPPS T-4 was found to have a melt viscosity of 1,100 poise.

(5) According to the same procedure as (4) except for using a mixture of 19.45 mols of P-DCB and 0.05 mols of 1,2,4-trichlorobenzene (crosslinking agent) in place of 19.5 mols of P-DCB and controlling the residual water content in the autoclave to 38 mols, polymerization was carried out to obtain a poly-p-phenylenethioether T-5. The crosslinked polymer T-5 thus produced was found to have a melt viscosity of 5,300 poise.

(6) A part of the powder of PPPS T-4 was crosslinked by subjecting it to a heat treatment at 250° C. in the air for 5 hours. The heat-crosslinked polymer T6 was found to have a melt viscosity of 5,800 poise.

(7) An autoclave was charged with 10 mols of the PPPS T4, 40 g of sodium ethylate, 12 kg of NMP and 110 mols of water, and the reaction was carried out at 265° C. for 3.5 hours to obtain a poly-p-phenylenethioether T-7. The linear polymer obtained was found to have a melt viscosity of 31,000 poise.

Molding examples 1–5 and Comparative molding examples 1–9

The polyarylenethioether samples of T-1–T-7 obtained were pelleted by a pelletizer and molded into bottles with a volume of 500 ml, resin amount of 31–33 g and barrel length of 18 cm.

(1) Molding was performed according to the process of the present invention, namely the process of forming of a bottomed parison by injection molding→stretching blow molding. The molding conditions in the respective processing steps and their evaluation results are shown in Table 1.

(2) In the respective steps of processing, when the breaking ratio exceeded 50% in the processing, indicated with a symbol (−), processing in the subsequent steps were intermitted. When the breaking ratio was 50% or lower in the processing, indicated by a symbol (+), processing was allowed to proceed to the next step for further testing.

(3) For heat resistant test of the stretched blow-molded products with 50% or less of breaking ratio in the respective steps, the boiling test and the high pressure steam sterilization tests were conducted. Those deformed by boiling test were rated as (−) and those without deformation as (+). Those without deformation in both boiling test and high pressure steam sterilization test were rated as (++). The boiling test was conducted by heating a sample in boiling water for 30 minutes, and the high pressure steam sterilization test by heating a sample in high pressure steam at 150° C. for 30 minutes.

The breaking ratio of molded product was measured by permitting a bottle filled with water to fall from a height of 30 cm, and the breaking ratio of 50% or higher was evaluated as (−). Transparency was evaluated by rating devitrification with formation of coarse spherical crystals as (−).

The results are summarized in Table 1.

In Examples 1 to 5, stretching blowing could be successfully effected and the vessels obtained had also excellent physical properties. In Comparative Example 1, the resin used had too low a viscosity and therefore stretch breakage occurred due to shortage in strength. In Comparative Example 2, the resin had too high a polymerization degree and therefore lateral stretching was difficult even at an elevated stretching temperature. On the other hand, in Comparative Examples 3 and 4, stretching was poorly effected because of the molding materials being crosslinked. In Comparative Example 5, too high a temperature of the mold gave rise to formation of spherical crystals, resulting in poor stretching. In Comparative Example 6, lateral stretching was difficult due to excessive longitudinal stretching. In Comparative Example 7, since longitudinal stretching was done at a temperature lower than Tg, the stretching was difficult. In Comparative Example 8, breaking occurred due to excessive lateral stretching. In Comparative Example 9, stretching was impossible due to low lateral stretching temperature. For these reasons, in any of the Comparative examples, the breaking ratio during processing was 50% or higher.

TABLE I

| No. | Example 1 | Example 2 | Example 3 | Example 4 | Example 5 |
|---|---|---|---|---|---|
| Polyarylenethioether | T-1 | T-2 | T-1 | T-3 | T-1 |
| Additive | — | — | Silica powder 2 wt. % | Carbon black 1 wt. % | — |
| Molding conditions | | | | | |
| Process | present process | present process | present process | present process | present process |
| Injection mold temp. (°C.) | 40 | 40 | 50 | 40 | 40 |
| Longitudinal stretching temp. (°C.) | 100 | 105 | 105 | 100 | 100 |
| Longitudinal stretching ratio (fold) | 2.4 | 2.6 | 2.6 | 2.0 | 2.4 |
| Lateral stretching temp (°C.) | 120 | 120 | 130 | 120 | 125 |
| Lateral stretching ratio (fold) | 2.3 | 2.2 | 2.0 | 2.0 | 2.4 |
| Heat set temp. (°C.) | — | 240 | 240 | 240 | 230 |
| Heat set time (sec.) | — | 10 | 10 | 10 | 20 |
| Breaking ratio during processing | (+) | (+) | (+) | (+) | (+) |
| Physical properties of bottle | | | | | |
| Heat resistance | (++) | (++) | (++) | (+) | (++) |
| Breaking ratio | (+) | (+) | (+) | (+) | (+) |
| Transparency | (+) | (+) | (+) | — | (−) |

TABLE I-continued

| Remarks | | | | | Black coloration | | | | |
|---|---|---|---|---|---|---|---|---|---|
| No. | Comp. Exam. 1 | Comp. Exam. 2 | Comp. Exam. 3 | (bis) Comp. Exam. 4 | Comp. Exam. 5 | Comp. Exam. 6 | Comp. Exam. 7 | Comp. Exam. 8 | Comp. Exam. 9 |
| Polyarylenethioether | T-4 | T-7 | T-5 | T-6 | T-1 | T-1 | T-1 | T-1 | T-1 |
| Additive | — | — | — | — | — | — | — | — | — |
| Molding condition | | | | | | | | | |
| Process | present process | present process | present process | present process | present process | present process | present process | present process | present process |
| Injection mold temp. (°C.) | 40 | 40 | 40 | 40 | 140 | 40 | 40 | 40 | 40 |
| Longitudinal stretching temp. (°C.) | 100 | 100 | 100 | 100 | 100 | 100 | 60 | 100 | 100 |
| Longitudinal stretching ratio (fold) | 2.4 | 2.2 | 2.2 | 2.3 | 2.2 | 6.5 | 2.2 | 2.3 | 2.5 |
| Lateral stretching temp. (°C.) | 100 | 120 | — | — | — | — | — | 120 | 80 |
| Lateral stretching ratio (fold) | 2.3 | 2.2 | — | — | — | — | — | 6.5 | 1.7 |
| Heat set temp. (°C.) | — | — | — | — | — | — | — | — | — |
| Heat set time (sec.) | — | — | — | — | — | — | — | — | — |
| Breaking ratio during processing | (+) | (−) | (−) | (−) | (−) | (−) | (−) | (−) | (−) |
| Physical properties of bottle | | | | | | | | | |
| Heat resistance | (−) | — | — | — | — | — | — | — | — |
| Breaking ratio | (−) | — | — | — | — | — | — | — | — |
| Transparency | (−) | — | — | — | — | — | — | — | — |
| Remarks | Low viscosity | High viscosity | Cross-linked | Cross-linked | High mold temp. | Large longitudinal stretching ratio | Low longitudinal stretching temp. | Large lateral stretching ratio | Low lateral stretching temp. |

Comparative molding example 10

Molding test was attempted for blow molding of a bottle with the same shape as mentioned above according to the prior art molding process in place of the process of the present invention, namely by forming a parison by extrusion molding, inserting it into a cooled mold, sealing the ends of the parison by closing both halves of the mold and blowing high pressure gas into the parison.

Due to too great a drawdown of the parison, the parison was elongated to give no product with sufficient thickness, and therefore most of the products were broken during blowing.

What is claimed is:

1. A process for producing a polyarylenethioether stretched blow-molded vessel, which comprises injecting a substantially linear polyarylenethioether having a melt viscosity of 3,000 to 20,000 poise measured at 310° C. and a shear rate of 200 sec$^{-1}$ into a mold of 0° to 130° C. to form a bottomed parison with an opening at an opposite end, pushing a rod into said bottomed parison through the opening thereof to stretch the parison at a resin temperature of 80° to 150° C. in the longitudinal direction of 1.5 to 6-fold, subsequently blowing a gas into the parison at a resin temperature of 90° to 180° C. within a mold for formation of a vessel to stretch the parison in the lateral direction to 1.5 to 6-fold and maintaining the stretched blow-molded vessel obtained by stretching a bottomed parison in longitudinal and lateral directions at a temperature of 150° to 260° for 1 second to 60 minutes to effect heat setting thereof.

2. A process for producing a stretched blow-molded vessel according to claim 1, wherein the polyarylenethioether is a substantially linear poly-p-phenylenethioether.

3. A process for producing a stretched blow-molded vessel according to claim 1, wherein the polyarylenethioether is a block copolymer comprising 70 to 95 mol% of the recurring units of

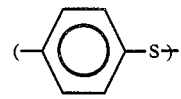

in a block and 5 to 30 mol% of the recurring units of

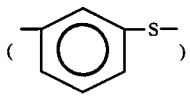

in a block.

4. A process for producing a stretched blow-molded vessel according to claim 1, wherein the polyarylenethioether has a melt viscosity of 4,000 to 15,000.

* * * * *